United States Patent
Chauhan

(10) Patent No.: US 9,805,384 B2
(45) Date of Patent: Oct. 31, 2017

(54) METHOD AND SYSTEM FOR PAYMENT CARD LINKED OFFER GENERATION

(71) Applicant: MasterCard International Incorporated, Purchase, NY (US)

(72) Inventor: Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 795 days.

(21) Appl. No.: 14/173,389

(22) Filed: Feb. 5, 2014

(65) Prior Publication Data
US 2015/0220957 A1    Aug. 6, 2015

(51) Int. Cl.
G06Q 30/02    (2012.01)
G06Q 20/34    (2012.01)
G06Q 20/20    (2012.01)
G06Q 20/38    (2012.01)

(52) U.S. Cl.
CPC ....... *G06Q 30/0222* (2013.01); *G06Q 20/204* (2013.01); *G06Q 20/34* (2013.01); *G06Q 20/387* (2013.01); *G06Q 20/38215* (2013.01); *G06Q 30/0238* (2013.01); *G06Q 30/02* (2013.01); *G06Q 30/0207* (2013.01); *G06Q 30/0215* (2013.01); *G06Q 30/0236* (2013.01); *G06Q 30/0239* (2013.01)

(58) Field of Classification Search
CPC .. G06Q 30/02; G06Q 20/387; G06Q 30/0238; G06Q 30/0239; G06Q 20/3274; G06Q 30/0215; G06Q 20/20; G06Q 30/0207; G06Q 30/0211; G06Q 30/0236
See application file for complete search history.

(56) References Cited

U.S. PATENT DOCUMENTS

| | | | |
|---|---|---|---|
| 6,450,407 B1 * | 9/2002 | Freeman | G06K 19/0723 235/376 |
| 2001/0001145 A1 | 5/2001 | Barnett | |
| 2007/0192790 A1 | 8/2007 | Takano | |
| 2008/0133366 A1 | 6/2008 | Evans | |
| 2010/0312626 A1 * | 12/2010 | Cervenka | G06Q 20/12 705/14.17 |

(Continued)

OTHER PUBLICATIONS

"Office Action Issued in U.S. Appl. No. 14/069,579", Mailed Date: Sep. 6, 2016, 31 Pages.

*Primary Examiner* — Christopher Stanford
(74) *Attorney, Agent, or Firm* — Buchanan Ingersoll & Rooney PC

(57) ABSTRACT

A method for discounting a payment transaction include: storing, in a memory, transaction data for a payment transaction, wherein the transaction data includes at least a transaction amount; receiving, by a receiving device, payment data associated with a payment account, wherein the payment data includes at least a payment account number; receiving, by the receiving device, offer data, wherein the offer data includes an offer identifier associated with the payment account and a transaction modifier; encrypting, using a predetermined encryption key, at least a portion of the payment account number to obtain an encrypted account number; and updating, in the memory, the transaction amount included in the transaction data based on the transaction modifier if the encrypted account number corresponds to the offer identifier.

12 Claims, 9 Drawing Sheets

(56) References Cited

U.S. PATENT DOCUMENTS

2011/0302012 A1* 12/2011 Duroux ................. G06Q 30/02
                                                       705/14.17
2012/0029994 A1    2/2012 Barkan
2013/0085835 A1*  4/2013 Horowitz ........... G06Q 30/0207
                                                       705/14.38
2014/0297382 A1* 10/2014 Chiussi ............. G06Q 30/0225
                                                       705/14.26

* cited by examiner

METHOD AND SYSTEM FOR PAYMENT CARD LINKED OFFER GENERATION

FIELD

The present disclosure relates to the discounting of a payment transaction, specifically the generating of an offer to be used exclusively by a specific payment card and the redemption thereof at a point of sale using encrypted payment data.

BACKGROUND

Offers, such as coupons, deals, discounts, rewards, etc., are often used by merchants, manufacturers, retailers, and other entities to increase consumer business. Merchants may hope to gain return customers who redeem an offer at their store, or may hope that customers shop at their store to redeem an offer and then buy additional products that recoup any potential loss of profits from the offer. Manufacturers may hope to gain a loyal customer who will provide repeat business following the purchase of a product using an offer.

While it may generally be of interest for a merchant or manufacturer to gain as large of a customer base as possible, the wide distribution of offers may require significant resources and carry a large expense. As a result, offers are often distributed to particular groups of consumers considered to be more likely to redeem an offer and/or return to the store or product afterwards, identified using targeting techniques, such as based on consumer demographics and/or transaction data. To this end, merchants and manufacturers, and/or offer distributers working on behalf or to the advantage of the merchants and manufacturers, may spend considerable time and resources to identify ideal consumers for the receipt of offers.

However, in many instances, offers distributed to consumers are not exclusive to the consumer. In such instances, the specifically-targeted consumer may pass the offer on to a different consumer that is outside of the merchant or manufacturer's target market. This may result in a consumer that is unlikely to be a repeat customer redeeming an offer, which may financially hurt the merchant in cases where a merchant may accept a loss for redemption of an offer in the hope of eventual returns through repeat business.

In an effort to provide offers that are exclusive to specific consumers, some merchants have begun to provide offers to consumers via loyalty programs. In such programs, the merchant may associate offers with a specific consumer, which may then be redeemed by only that consumer after providing proof of their loyalty account. However, such a system requires consumers to previously register with the merchant to obtain a loyalty account, and thus is inadequate for providing offers to first-time consumers. In addition, such systems are ineffective for manufacturers who wish to provide offers to consumers for redemption at multiple merchants. In order to provide consumer-exclusive offers to consumers that may be redeemed at multiple merchants, some manufacturers have begun providing offers where each distributed offer has a unique identifier or redemption code. However, such offers may still be susceptible to being passed to other consumers as there are no controls on redemption.

Thus, there is a need for a technical solution for the generating and distribution thereof of offers that are exclusive to a specific payment card associated with a consumer that may be redeemed exclusively by the use of that payment card at multiple merchants without relying on a closed loop system.

SUMMARY

The present disclosure provides a description of systems and methods for the discounting of payment transactions and distribution of offer data.

A method for discounting a payment transaction include: storing, in a memory, transaction data for a payment transaction, wherein the transaction data includes at least a transaction amount; receiving, by a receiving device, payment data associated with a payment account, wherein the payment data includes at least a payment account number; receiving, by the receiving device, offer data, wherein the offer data includes an offer identifier associated with the payment account and a transaction modifier; encrypting, using a predetermined encryption key, at least a portion of the payment account number to obtain an encrypted account number; and updating, in the memory, the transaction amount included in the transaction data based on the transaction modifier if the encrypted account number corresponds to the offer identifier.

A method for distributing offer data includes: storing, in an offer database, a plurality of offer data entries, wherein each offer data entry includes data related to an offer for the purchase of goods or services including at least offer data and a transaction modifier; receiving, by a receiving device, a payment account number associated with a payment account; encrypting, using a predetermined encryption key, at least a portion the received payment account number to obtain an encrypted account number; identifying, in the database, a specific offer data entry; and transmitting, by a transmitting device, at least the encrypted account number and the offer data and transaction modifier included in the specific offer data entry to a consumer associated with the payment account.

A system for discounting a payment transaction includes a memory, a receiving device, and a processing device. The memory is configured to store transaction data for a payment transaction, wherein the transaction data includes at least a transaction amount. The receiving device is configured to receive: payment data associated with a payment account, wherein the payment data includes at least a payment account number; and offer data, wherein the offer data includes an offer identifier associated with the payment account and a transaction modifier. The processing device is configured to: encrypt, using a predetermined encryption key, at least a portion of the payment account number to obtain an encrypted account number; and update, in the memory, the transaction amount included in the transaction data based on the transaction modifier if the encrypted account number corresponds to the offer identifier.

A system for distributing offer data includes an offer database, a receiving device, a processing device, and a transmitting device. The offer database is configured to store a plurality of offer data entries, wherein each offer data entry includes data related to an offer for the purchase of goods or services including at least offer data and a transaction modifier. The receiving device is configured to receive a payment account number associated with a payment account. The processing device is configured to: encrypt, using a predetermined encryption key, at least a portion the received payment account number to obtain an encrypted account number; and identify, in the database, a specific offer data entry. The transmitting device is configured to transmit at least the encrypted account number and the offer data and transaction modifier included in the specific offer data entry to a consumer associated with the payment account.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
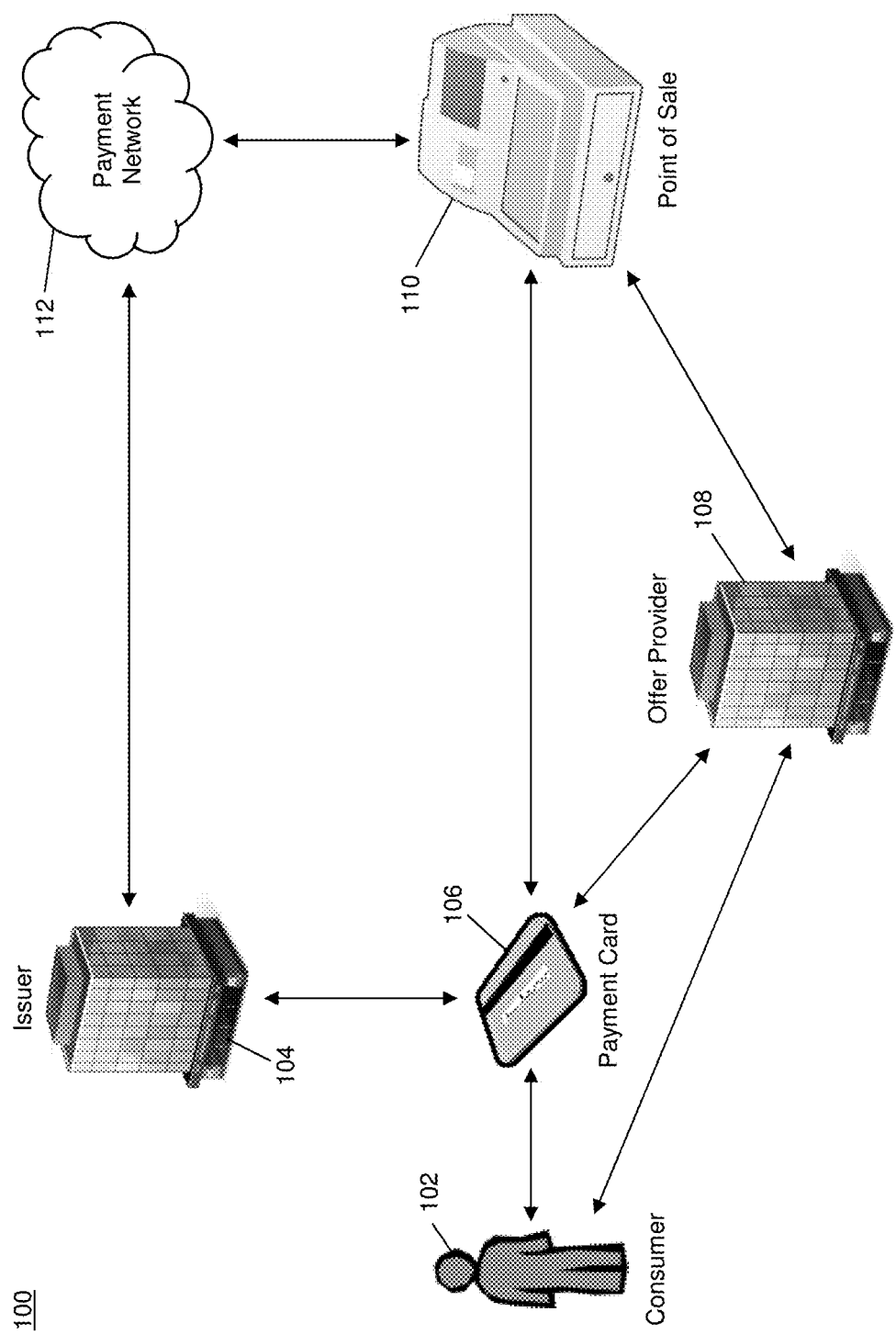
FIG. 1 is a high level architecture illustrating a system for the distribution of offer data and discounting of a payment transaction based thereon in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Definition of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Account—A financial account that may be used to fund a transaction, such as a checking account, savings account, credit account, virtual payment account, etc. A payment account may be associated with an entity, which may include a person, family, company, corporation, governmental entity, etc. In some instances, a payment account may be virtual, such as those accounts operated by PayPal®, etc.

Payment Card—A card or data associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated payment account. In some instances, a check may be considered a payment card where applicable.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require and special knowledge in offered products. In some embodiments, an entity involved in a single transaction may be considered a merchant.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

System for the Distribution and Redemption of Card-Exclusive Offers

FIG. 1 illustrates a system 100 for the generation and distribution of offers exclusive to a specific payment card and the redemption thereof at a point of sale.

The system 100 may include a consumer 102. The consumer 102 may have one or more payment accounts opened with an issuer 104, such as an issuing bank. The issuer 104 may issue a payment card 106 to the consumer 102 associated with a payment account opened by the consumer 102 with the issuer 104. The payment card 106 may be encoded with payment data associated with the payment account and/or the consumer 102. For example, the payment card 106 may be encoded with a payment account number corresponding to the associated payment account.

The system 100 may also include an offer provider 108. The offer provider 108 may be a merchant, manufacturer, retailer, third party offer provider, or other suitable entity configured to generate offers exclusive to a consumer using the systems and methods as disclosed herein. As discussed in more detail below, the offer provider 108 may generate an encrypted identifier for an offer using an encryption key and at least a portion of the payment account number encoded in the payment card 106 as provided by the consumer 102. For example, the offer provider 108 may generate an identifier by encrypting specific digits (e.g., every third digit) of the payment account number using an encryption key.

The offer provider 108 may then generate a machine-readable code that is encoded with the encrypted offer identifier and additional offer data. The additional offer data may include an offer name, offer description, offer amount, transaction modifier, start date, end date, quantity, limitations on redemption, and other suitable data that will be apparent to persons having skill in the relevant art. The offer provider 108 may then distribute the offer including at least the generated machine-readable code to the consumer 102. Methods for distributing offer data to a consumer will be apparent to persons having skill in the relevant art and may include e-mail, short message service message, multimedia service message, a webpage, an application program, etc.

The consumer 102 may then initiate a payment transaction at a merchant point of sale 110 for the purchase of one or more products (e.g., goods and/or services). As part of the payment transaction, the consumer 102 may present the payment card 106 to the point of sale 110. The point of sale 110 may read the payment data encoded on the payment card 106 including the payment account number and decode the read data to obtain the payment details including the payment account number. The consumer 102 may also present the personalized offer to the point of sale 110. The point of sale 110 may read the machine-readable code associated with the offer to obtain and then decode the encoded offer data and encrypted identifier.

The offer provider 108 may transmit the encryption key used to obtain the encrypted identifier, or a second encryption key associated with the encryption key used to obtain the encrypted identifier, to the point of sale 110. In some instances, the offer provider 108 may transmit the encryption key to the point of sale 110 prior to the initiating of the payment transaction by the consumer 102. In other instances, the point of sale 110 may request the encryption key from the offer provider 108 when presented with the personalized offer. In some embodiments, an encryption key pair may be used such that the offer provider 108 uses a first key of the pair to encrypt the identifier, and the point of sale 110 may use a second key of the pair, as discussed in more detail below, to encrypt and/or decrypt data to validate the authenticity of the offer and the consumer 102.

The point of sale 110 may identify a payment account number read from the payment card 106. The point of sale 110 may encrypt at least a portion of the payment account number using the encryption key received from the offer provider 108. The point of sale 110 may then validate the offer presented by the consumer 102 by comparing the encrypted account number with the encrypted identifier read and decoded from the offer. If the validation is successful, the point of sale 110 may apply the offer to the transaction using the offer data via systems and methods that will be apparent to persons having skill in the relevant art.

The point of sale 110 may then submit the transaction data for the payment transaction to an acquirer (not shown), which may then generate and submit an authorization request for the payment transaction to a payment network 112. In some embodiments, the point of sale 110 may generate the authorization request, which may then be transmitted to the payment network 112 directly or via the acquirer. The payment network 112 may then process the discounted payment transaction using conventional methods and systems that will be apparent to persons having skill in the relevant art.

By encrypting the payment account number encoded on the payment card 106 for generating the identifier to be used for the card-specific offer, the offer may be redeemed at any point of sale 110 configured to perform the functions disclosed herein. As such, an offer may be provided by a manufacturer (e.g., as or via the offer provider 108) to the consumer 102 for redemption at a plurality of different merchants. In addition, by using an account number specific to the payment card 106 to generate the encrypted identifier, the offer may be redeemed only by the specific consumer 102 or other authorized user of the payment card 106. This may be beneficial for issuers 104 or other entities that may wish to encourage use of a specific payment card 106. In addition, by using the account number for a specific payment card 106, the offer may not be easily passed on to another consumer, and thus not redeemed by someone outside of the target market for a merchant or manufacturer.

Point of Sale Device

Figure 2:
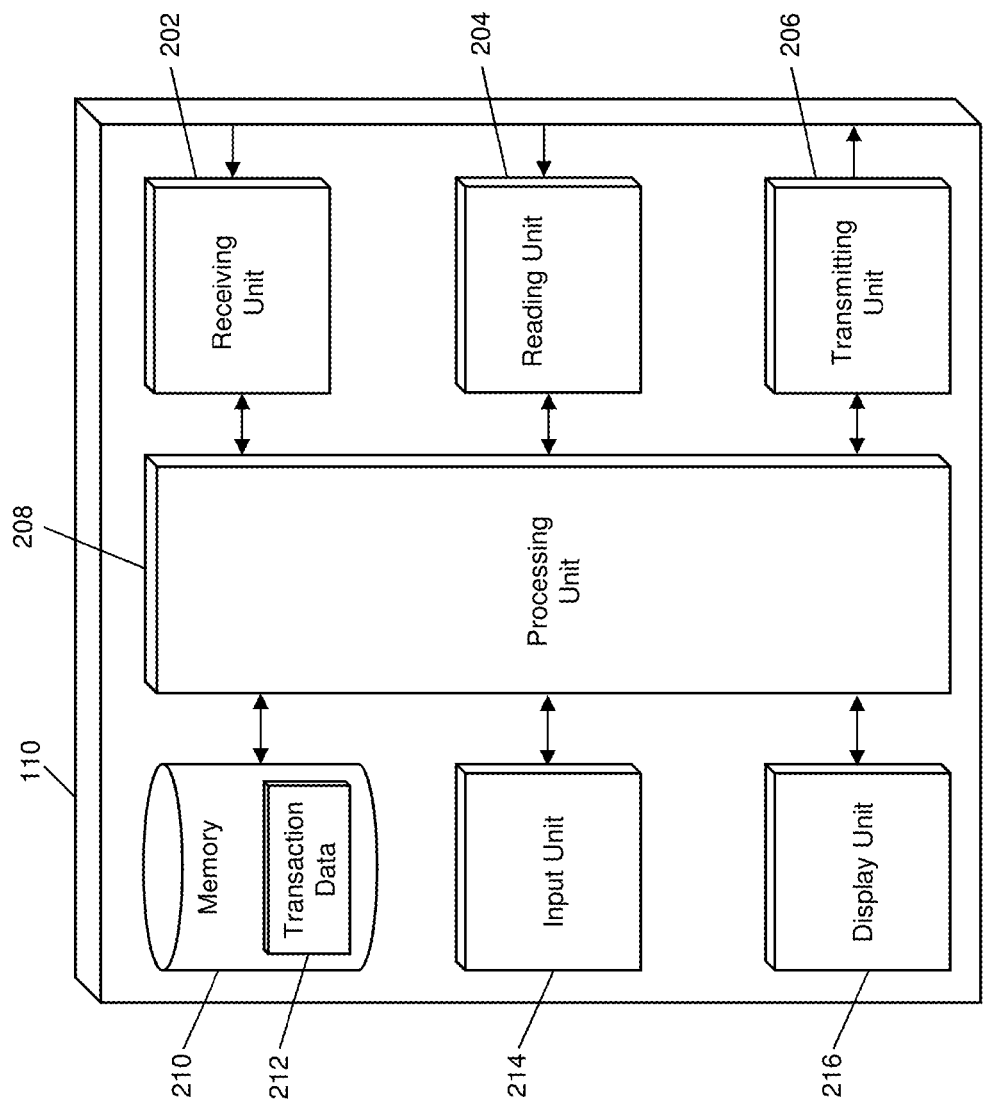
FIG. 2 is a block diagram illustrating the point of sale of FIG. 1 for the discounting of a payment transaction using a payment card-exclusive offer in accordance with exemplary embodiments.

FIG. 2 illustrates an embodiment of the point of sale 110 of the system 100. It will be apparent to persons having skill in the relevant art that the embodiment of the point of sale 110 illustrated in FIG. 2 is provided as illustration only and may not be exhaustive to all possible configurations of the point of sale 110 suitable for performing the functions as discussed herein. For example, the computer system 900 illustrated in FIG. 9 and discussed in more detail below may be a suitable configuration of the point of sale 110.

The point of sale 110 may include a receiving unit 202. The receiving unit 202 may be configured to receive data over one or more networks via one or more network protocols. The point of sale 110 may receive an encryption key from the offer provider 108 for use in encrypting consumer data for the validation of personalized offers as discussed herein. The point of sale 110 may also include a processing unit 208, which may be configured to store the received encryption key in a memory 210.

The point of sale 110 may further include one or more reading units 204. Each reading unit 204 may be configured to read encoded data using methods that will be apparent to persons having skill in the relevant art. The reading unit 204 may read product data for one or more products to be purchased by the consumer 102 as part of a payment transaction. The processing unit 208 may then store corresponding data (e.g., purchase amounts, quantity, etc.) as transaction data 212 in the memory 210. Methods and systems for generating transaction data based on read product data will be apparent to persons having skill in the relevant art.

The point of sale 110 may further include an input unit 214. The input unit 214 may be a keyboard, mouse, click wheel, touch screen, microphone, camera, or other suitable type of device for receiving input as will be apparent to persons having skill in the relevant art. In some instances, a user of the point of sale 110 may use the input unit 214 to enter product or transaction data and/or instruct the reading unit 204 to read product data from one or more products to be purchased. The point of sale 110 may also include a display unit 216. The display unit 216 may be configured to display the transaction data 212 and any other relevant information to a user. The display unit 216 may be any type of suitable display device, such as a liquid crystal display, light emitting diode display, cathode ray tube display, capacitive touch display, light projection display, etc.

The point of sale 110 may also include a reading unit 204 configured to read payment data encoded in a payment card 106. Methods for reading data encoded in a payment card will be apparent to persons having skill in the relevant art and may include magnetic strip swipe readers, near field communication readers, optical code readers, etc. The processing unit 208 may identify and decode the encoded data to obtain the payment data. The processing unit 208 may then identify a payment account number included in the payment data and encrypt at least a portion of the payment account number using the encryption key received and stored in the memory 210 to obtain an encrypted account number. In some embodiments, the offer provider 108 may further specify the portion of the account number to be encrypted with the encryption key and/or an algorithm for identifying the portion of the account number to be encrypted when providing the encryption key to the point of sale 110.

The reading unit 204, or a separate reading unit (not illustrated), may be configured to read offer data and an encrypted identifier encoded in a machine-readable code presented by the consumer 102 associated with an offer to be redeemed. The processing unit 208 may then decode the offer data and encrypted identifier. The processing unit 208 may compare the encrypted identifier encoded in the personalized offer with the encrypted account number. If the identifiers match, then the personalized offer may be validated as being presented by the payment card 106 to which the offer is associated. The processing unit 208 may then modify the transaction data 212 based on the offer data using methods and systems that will be apparent to persons having skill in the relevant art for discounting a transaction based on offer data.

If the identifiers do not match, the display unit 216 may display a notification for the user and/or the consumer 102 indicating the failed validation of the personalized offer. The consumer 102 and/or user may then retry the validation, such as by presenting the payment card 106 and re-presenting the personalized offer, which depending on the content of the encrypted identifier, might be suggested by a display the display unit 216. In some embodiments, the processing unit 208 may encrypt the identifier read and decoded from the personalized offer prior to comparison with the encrypted consumer identifier. In such an embodiment, the identifier included in the personalized offer may be unencrypted when read and decoded from the machine-readable code associated with the offer.

After the offer has been applied and the payment transaction discounted, a transmitting unit 206 in the point of sale 110 may be configured to transmit the transaction data 212 to an acquirer over one or more networks via one or more network protocols. In one embodiment, the processing unit 208 may first generate an authorization request for the payment transaction including the transaction data 212, which may then be transmitted by the transmitting unit 206 to the acquirer. In some instances, the transmitting unit 206 may be configured to transmit the authorization request directly to the payment network 112.

After the transaction has been processed by the payment network 112, the receiving unit 202 may receive an authorization response indicating approval or denial of the transaction. The display unit 216 may display the response to the user and/or the consumer 102 indicating the approval or denial of the transaction, which the merchant and consumer 102 may respond to accordingly to finalize the payment transaction. In some embodiments, the transmitting unit 206 may transmit a notification to the consumer 102, offer provider 108, and/or other suitable entity indicating the successful redemption of the personalized offer.

Process for Generating a Personalized Offer

Figure 3:
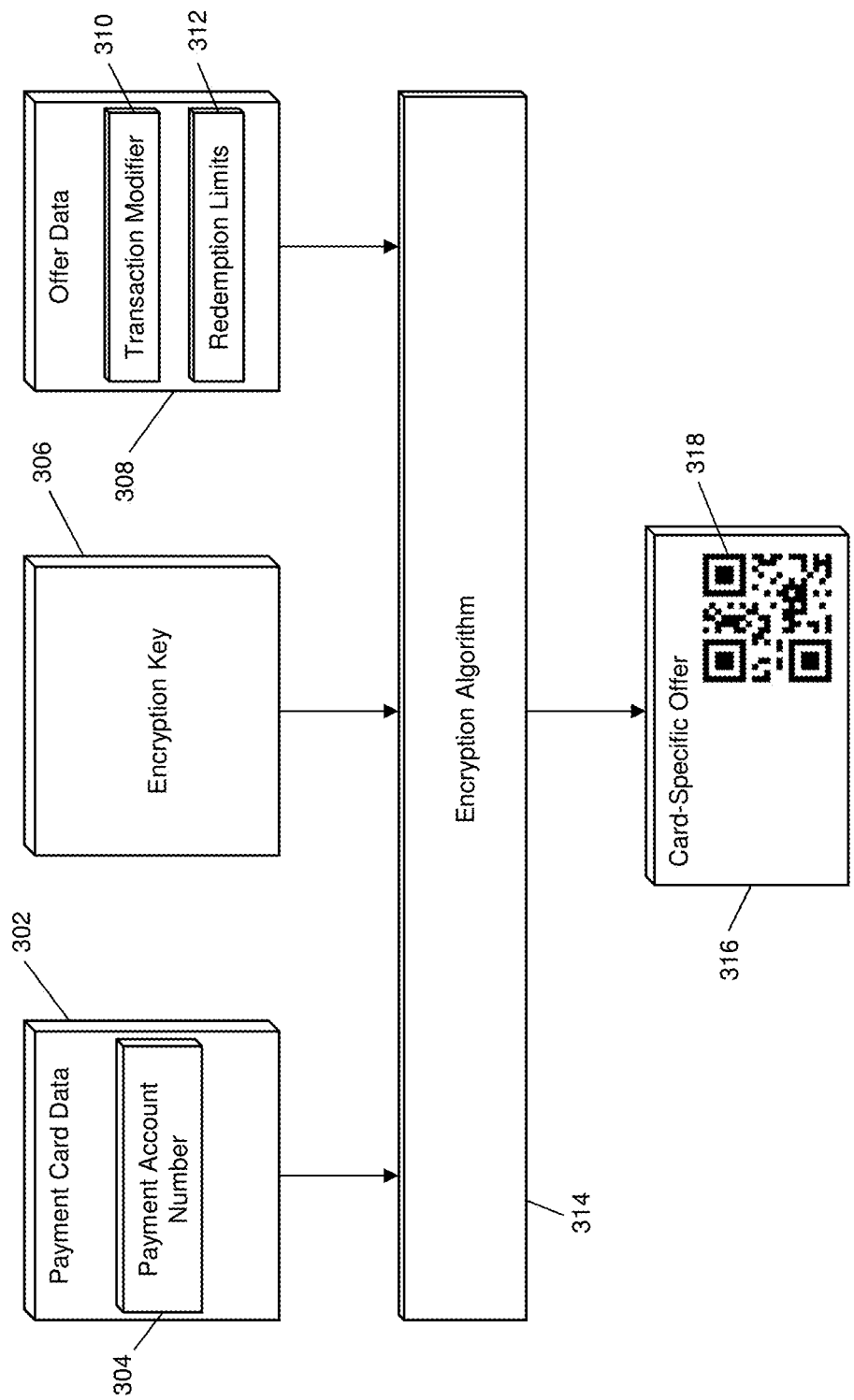
FIG. 3 is a flow diagram illustrating a process for the generating of a personalized consumer offer for distribution thereof in accordance with exemplary embodiments.

FIG. 3 illustrates a process for the generating of a personalized offer using an encrypted account number. The process illustrated in FIG. 3 and discussed herein may be executed by a processing device, such as the point of sale 110, the computer system 900 of FIG. 9, or other suitable processing device as will be apparent to persons having skill in the relevant art. For example, the offer provider 108 may include a computer system, such as the computer system 900 of FIG. 9, which may be configured to execute the process of FIG. 3 to generate a personalized offer as discussed herein.

As illustrated in FIG. 3, the generation of a personalized offer may utilize payment card data 302, an encryption key 306, and offer data 308. The payment card data 302 may include data associated with a payment account to which the personalized offer is to be associated. The payment card data 302 may include at least a payment account number 304, and any other suitable data that may be unique to the associated payment card 106 or otherwise used to identify the payment card 106 for validation of the personalized offer. In some instances, the entire payment account number 304 may be used. In other instances, only a portion of the payment account number 304 may be used, such as specific digits of the payment account number 304, which may be identified by the offer provider 108.

The encryption key 306 may be any suitable type of encryption key used for encrypting the payment card data 302 as will be apparent to persons having skill in the relevant art. In some embodiments, the encryption key 306 may be associated with the merchant or point of sale 110 with whom the personalized offer is to be redeemed. In a further embodiment, the encryption key 306 may be unique to a specific merchant. In some instances, the encryption key 306 may be one key of an encryption key pair. In such an instance, the corresponding encryption key may be transmitted to the point of sale 110 for use in validating the personalized offer.

The offer data 308 may include data regarding the personalized offer to be applied to the transaction data 212 by the point of sale 110 to discount the offer, and/or to the displayed to the consumer 102 (e.g., on or accompanying the personalized offer) indicating information regarding the personalized offer. The offer data 308 may include at least a transaction modifier 310 and redemption limits 312. The transaction modifier 310 may be a condition, amount, algorithm, etc. for application to the transaction data 212 for discounting of the payment transaction upon validation of the personalized offer. The redemption limits 312 may be one or more limits or conditions for redemption of the offer, such as a start date, end date, offer quantity, minimum transaction amount, etc. Additional data that may be included in the offer data 308 will be apparent to persons having skill in the relevant art.

The encryption key 306 may be applied to the payment card data 302 and offer data 308 via an encryption algorithm 314. The encryption algorithm 314 may be configured to encrypt, using the encryption key 306, at least the payment card data 302 (e.g., at least a portion of the payment account number 304) to obtain an encrypted identifier. In some embodiments, the encryption algorithm 314 may also encrypt the offer data 308 with the encryption key 306. In other embodiments, the encryption algorithm 314 may combine the unencrypted offer data 308 with the encrypted payment card data 302 to obtain a single set of data for the personalized offer.

The processing of the encryption algorithm 314 may yield the personalized or card-specific offer 316. The personalized offer 316 may include a generated machine-readable code 318, such as a bar code or a QR code. The machine-readable code 318 may be encoded with the output of the encryption algorithm 314, which may include the encrypted payment card data 302 and the offer data 308. The encrypted payment card data 302 and the offer data 308 may be combined into a single set of data encoded in the machine-readable code 318 or may be encoded in the machine-readable code 318 as two separate sets of data (e.g., as indicated by a separator) using methods and systems that will be apparent to persons having skill in the relevant art.

The personalized offer 316 may then be distributed to the consumer 102 associated with the payment card data 302 used to generate the offer. The consumer 102 may then present the personalized offer 316 at the point of sale 110, where the point of sale 110 may read the machine-readable code 318 and process the data, using methods and systems discussed herein, to validate the consumer 102 as authorized to redeem the personalized offer 316. In some embodiments, the personalized offer 316 may include offer data 308 viewable by the consumer 102, such as to identify the offer (e.g., an offer name or offer description) and/or terms of the offer (e.g., the offer amount, offer type, expiration date, etc.).

Process for Discounting a Transaction Using the Personalized Offer

Figure 4:
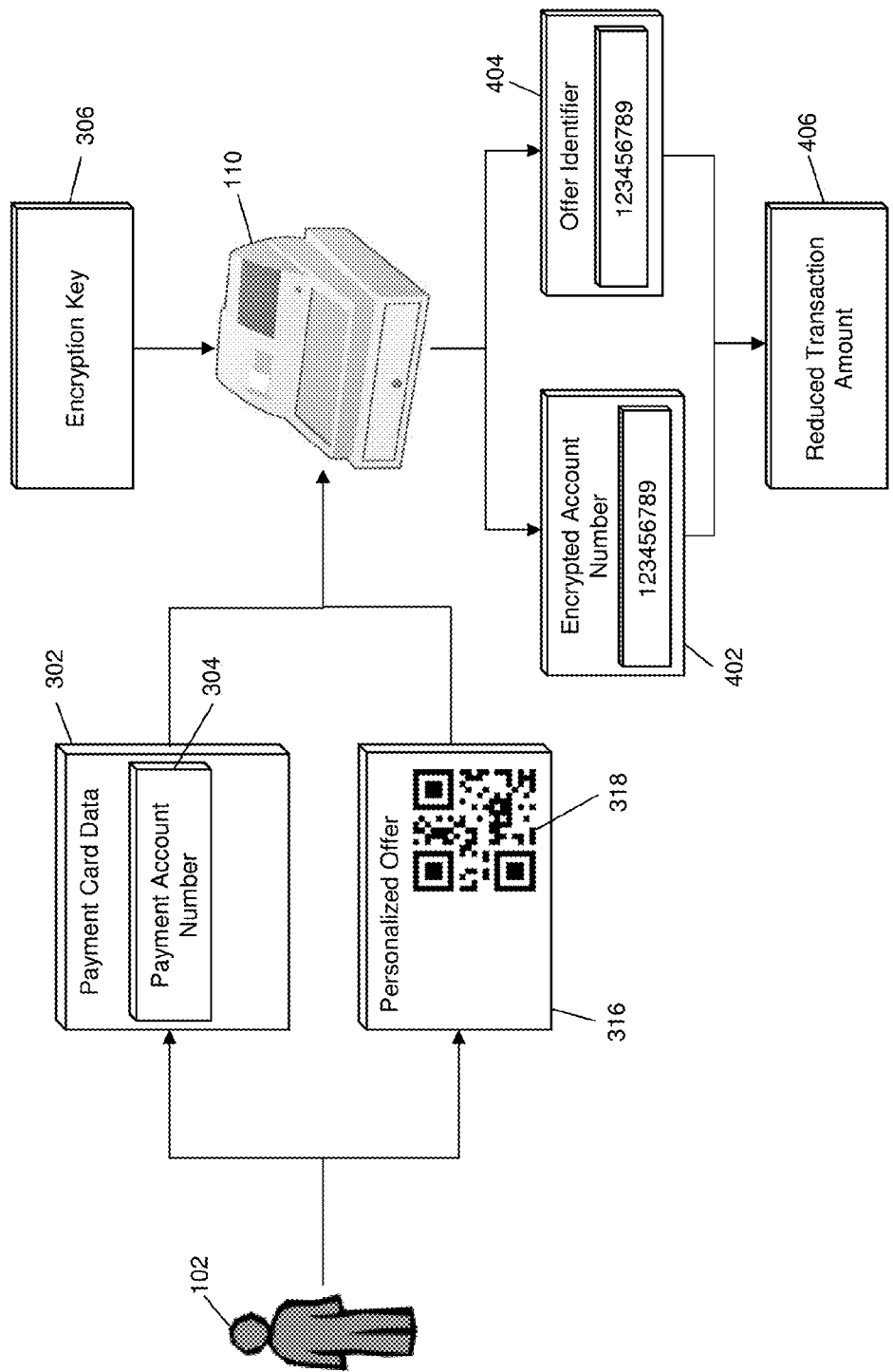
FIG. 4 is a flow diagram illustrating a process for the identification of a card-exclusive offer and use thereof to discount a payment transaction in accordance with exemplary embodiments.

FIG. 4 illustrates a process for the presentation and processing of the personalized offer generated using the process of FIG. 3.

The consumer 102 may visit a merchant and initiate a payment transaction. As part of the payment transaction, the consumer 102 may present the payment card 106 for payment to the point of sale 110. The point of sale 110 may read payment card data 302 encoded in the payment card 106. The payment card data 302 may include at least a payment account number 304 used to generate the personalized offer 316, as discussed above with respect to the process of FIG. 3.

The consumer 102 may also present the personalized offer 316 to the point of sale 110. The point of sale 110 may read the machine-readable code 318 to obtain the offer data 308 and an encrypted offer identifier 404 encoded therein. Prior to, or during, the processing of the payment transaction, the point of sale 110 may also receive the encryption key 306 used to generate the encrypted offer identifier 404 decoded from the machine-readable code 318 (e.g., or a key corresponding to the encryption key 306).

The point of sale 110 may then encrypt the payment account number 304 included in the payment card data 302 to obtain an encrypted account number 402. In some embodiments, the machine-readable code 318 may be encoded with an unencrypted identifier. In such an embodiment, the point of sale 110 may encrypt the unencrypted identifier using the encryption key 306 or a second encryption key to obtain the offer identifier 404.

The point of sale 110 may then compare the encrypted account number 402 to the offer identifier 404 to validate the payment card 106 used by the consumer 102 to redeem the offer. If the two identifiers 402 and 404 are equal, as is illustrated in FIG. 4, then the processing unit 208 of the point of sale 110 may apply the offer data 308 (e.g., including the transaction modifier 310) encoded in the machine-readable code 318 to the transaction data 212 to obtain a reduced transaction amount 406. The payment transaction may then be processed, by the payment network 112, for the reduced transaction amount 406 as a result of the successfully redeemed offer.

Method for Generating, Distributing, and Process a Personalized Offer

Figure 5:
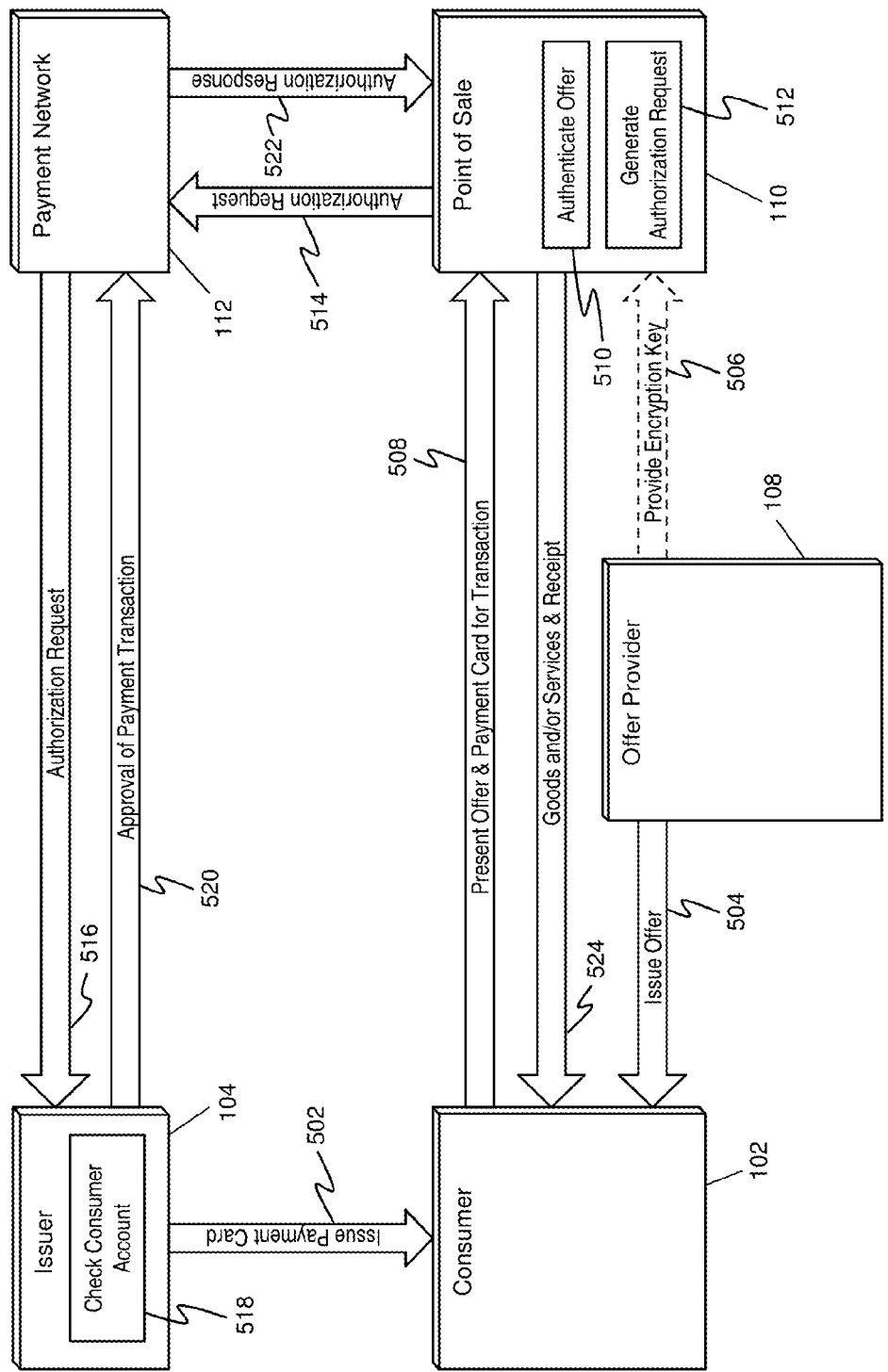
FIG. 5 is a flow diagram illustrating a method for the generating and distribution of an offer exclusive to a payment card and the redemption thereof at a point of sale using the system of FIG. 1 in accordance with exemplary embodiments.

FIG. 5 illustrates a method for the generating and distribution of a personalized offer to the consumer 102 and the processing thereof by the point of sale 110 using the system 100 of FIG. 1.

In step 502, the issuer 104 may issue the payment card 106 to the consumer 102. The payment card 106 may be encoded with payment card data 302. The payment card data 302 may include at least a payment account number 304 corresponding to the payment account associated with the payment card 106. In step 504, the offer provider 108 may distribute a personalized offer 316 to the consumer 102, such as the personalized offer 316 generated using the process illustrated in FIG. 3 and discussed herein. The personalized offer 316 may include a machine-readable code 318 encoded with offer data and an offer identifier 404. In step 506, the offer provider 108 may transmit an encryption key 306 to the point of sale 110 for use in validating the personalized offer 316. It will be apparent to persons having skill in the relevant art that step 506 may be an optional step.

In step 508, the consumer 102 may initiate a payment transaction at the point of sale 110. Initiating the payment transaction may include presenting the payment card 106 and the personalized offer 316 to the point of sale 110. In step 510, the point of sale 110 may authenticate the personalized offer 316. Authentication of the personalized offer 316 may include encrypting at least a portion of the payment account number 304 included in the payment card data 302 to obtain an encrypted account number 402 and comparing the encrypted account number 402 to the offer identifier 404. Once the offer is authenticated, the processing unit 208 of the point of sale 110 may discount the transaction amount based on the offer data 308 and may generate an authorization request reflected the updated transaction data, in step 512.

In step 514, the point of sale 110 (e.g., or an acquirer associated with the point of sale 110) may transmit the authorization request to the payment network 112 for processing. In step 516, the payment network 112 may forward the authorization request to the issuer 104. In step 518, the issuer 104 may check the payment account used to fund the payment transaction based on the payment card data 302 provided by the consumer 102 and included in the authorization request. Checking the payment account may include checking for adequate funds and/or credit to fund the payment transaction based on account information and a transaction amount included in the authorization request.

In step 520, the issuer 104 may transmit an approval of the payment transaction to the payment network 112 indicating the ability for the consumer 102 to pay the discounted amount for the payment transaction. In step 522, the payment network 112 may transmit an authorization response indicating approval of the payment transaction to the point of sale 110. It will be apparent to persons having skill in the relevant art that steps 514 through 522 represent a traditional method for processing a payment transaction and that additional, or alternative. steps and/or methods may be used to process the payment transaction. In step 524, the merchant associated with the point of sale 110 may provide the purchased goods and/or services to the consumer 102 and/or furnish the consumer 102 with a receipt for the payment transaction.

Method for Processing a Personalized Offer to Discount a Payment Transaction

Figure 6:
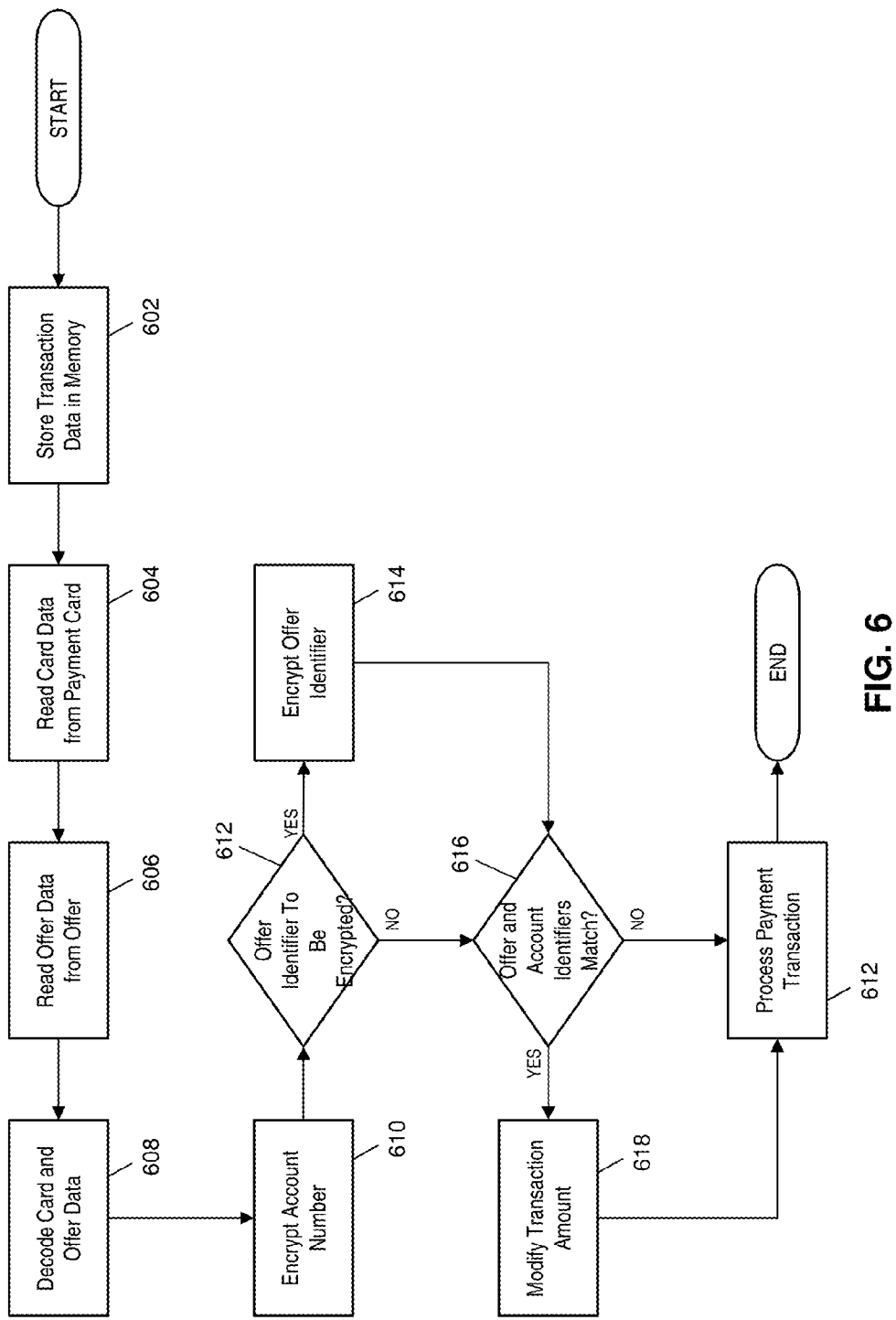
FIG. 6 is a flow chart illustrating a method for the identification of a card-exclusive offer and processing thereof to discount a payment transaction by the point of sale of FIG. 2 in accordance with exemplary embodiments.

FIG. 6 illustrates a method for processing a personalized offer 316 at the point of sale 110 to discount a payment transaction. In one embodiment, the method illustrated in FIG. 6 may be performed as part of steps 510 and 512 of the process illustrated in FIG. 5.

In step 602, the processing unit 208 of the point of sale 110 may store the transaction data 212 in the memory 210. The transaction data 212 may include a transaction amount, product data (e.g., read by the reading unit 204 and/or input by the input unit 214, etc.), and other relevant data. In step 604, a reading unit 204 of the point of sale 110 may read card data from the payment card 106 presented by the consumer 102. The card data may be encoded in the payment card 106 (e.g., in a magnetic stripe, near field communication chip, secure element, etc.) for reading by the reading unit 204.

In step 606, a reading unit 204 may read offer data encoded in a machine-readable code 318 associated with a personalized offer 316 presented by the consumer 102 to the point of sale 110. In step 608, the processing unit 208 may decode the card data to obtain payment card data 302 encoded therein. The payment card data 302 may include at least a payment account number 304. The processing unit 208 may also decode the read offer data to obtain at least a transaction modifier 310 and an offer identifier 404 encoded therein.

In step 610, the processing unit 208 may use an encryption key 306 (e.g., and stored in the memory 210) to encrypt the payment account number 304 included in the payment card data 302 to obtain an encrypted account number 402. In some embodiments, the processing unit 208 may use an encryption key 306 identified based on information included in the offer data. For example, the offer data may include a key identifier, an identifier associated with the offer provider 108, or other suitable information that may be used to identify an encryption key 306 for use in the encryption of the consumer identifier for validation of the personalized offer 316.

In step 612, the processing unit 208 may determine if the identifier included in the offer data needs to be encrypted prior to validation. In some embodiments, the processing unit 208 may determine the need for the identifier included in the offer data to be encrypted based on information included in the offer data and/or programming instructions (e.g., stored in the memory 210). If the identifier is to be encrypted, then, in step 614, the processing unit 208 may encrypt the identifier to obtain the offer identifier 404.

Once the offer identifier 404 has been encrypted, or if the offer identifier 404 does not need to be encrypted, then, in step 616, the processing unit 208 may compare the encrypted account number 402 with the offer identifier 404 to determine if the payment card 106 is the valid card for redeeming the personalized offer 316. If the comparison is successful, then, in step 618, the processing unit 208 may modify the transaction amount included in the transaction data 212 based on at least the transaction modifier 310 included in the transaction data. Methods and systems used for discounting a transaction amount based on offer data will be apparent to persons having skill in the relevant art.

Once the transaction data 212 has been modified, or if the consumer 102 is not eligible to redeem the personalized offer 316 (e.g., because of a failed validation at step 616 and/or violation of redemption limits 312 set to the personalized offer 316), the processing unit 208 may process the payment transaction, in step 612. In one embodiment, processing the payment transaction may include transmitting the transaction data 212 to an acquirer. In another embodiment, processing the payment transaction may include generating an authorization request including the transaction data 212 and the payment card data 302. In a further embodiment, the transmitting unit 206 of the point of sale 110 may transmit the generated authorization request to the payment network 112 for processing.

Exemplary Method for Discounting a Payment Transaction

Figure 7:
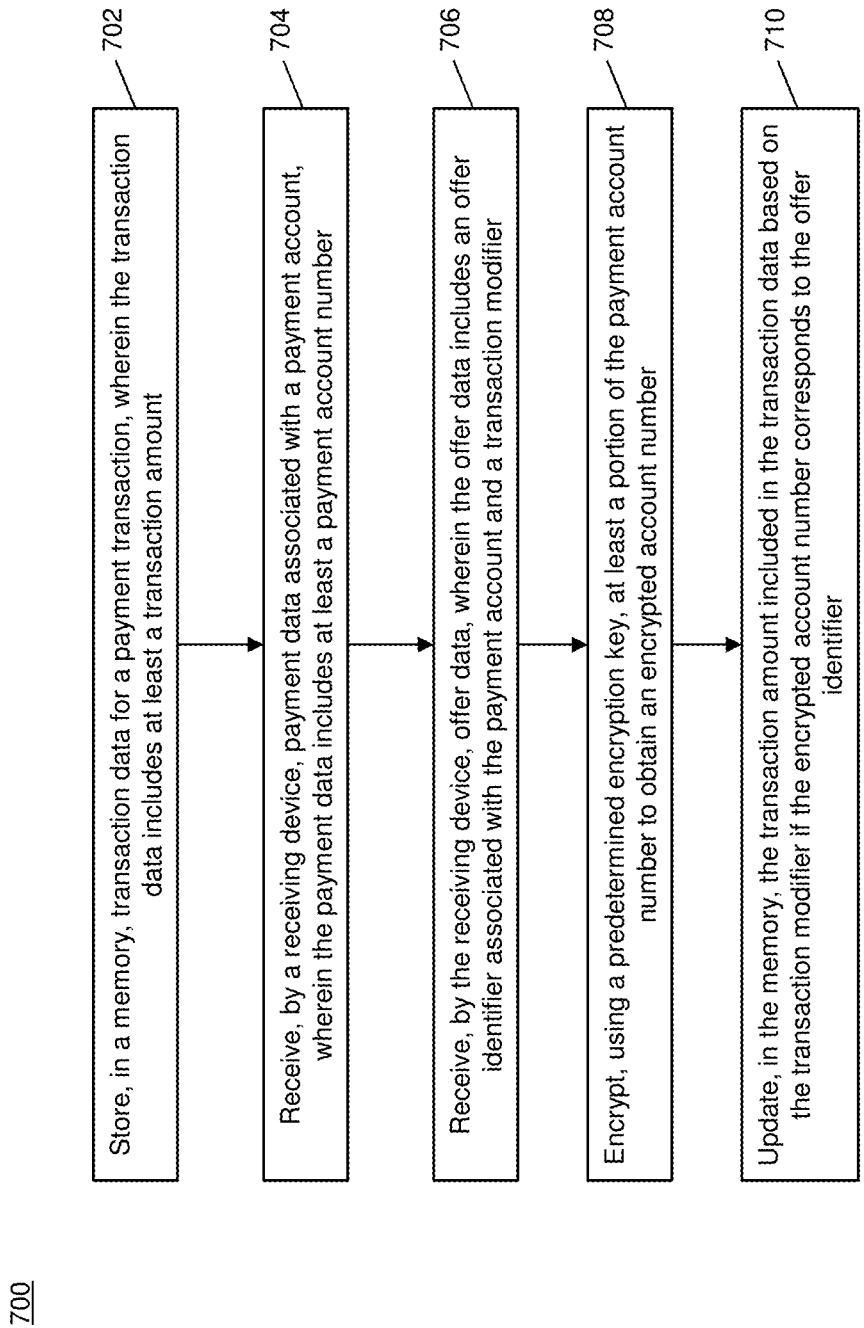
FIG. 7 is a flow chart illustrating an exemplary method for discounting a payment transaction in accordance with exemplary embodiments.

FIG. 7 illustrates a method 700 for the discounting of a payment transaction based on a personalized offer 316.

In step 702, transaction data (e.g., the transaction data 212) for a payment transaction may be stored in a memory (e.g., the memory 210), wherein the transaction data 212 includes at least a transaction amount. In one embodiment, the transaction data 212 may further include at least one of: transaction time and/or date, merchant name, merchant category, device identifier, merchant identifier, and product data.

In step 704, payment data associated with a payment account may be received, by a receiving device (e.g., the receiving unit 202), wherein the payment data includes at least a payment account number (e.g., the payment account number 304). In step 706, offer data (e.g., the offer data 308) may be received, by a receiving unit (e.g., the receiving device 202), wherein the offer data 308 includes an offer identifier (e.g., the offer identifier 404) associated with the payment account and a transaction modifier (e.g., the transaction modifier 310). In some embodiments, the offer data 312 may further include at least one of: offer name, offer description, offer type, manufacturer data, merchant data, product data, start date, expiration date, quantity, and limitation on redemption.

In one embodiment, receiving the payment data may include reading, by a first reading device (e.g., the reading unit 204), card data encoded on a payment card, and decoding, by a processing device (e.g., the processing unit 208), the received card data to obtain the payment data, and receiving the offer data 308 may include reading, by a second reading unit (e.g., the reading device 204), encoded offer data encoded in a machine-readable code (e.g., the machine-readable code 318), and decoding, by the processing device 208, the read encoded offer data to obtain the offer data 308. In a further embodiment, the first reading unit 204 and the second reading unit 204 may be a single device.

In step 708, at least a portion of the payment account number 304 may be encrypted, using a predetermined encryption key (e.g., the encryption key 306), to obtain an encrypted account number (e.g., the encrypted account number 402). In one embodiment, encrypting at least a portion of the payment account number 304 may include encrypting predetermined digits of the payment account number 304.

In step 710, the transaction amount included in the transaction data 212 may be updated, in the memory 210, based on the transaction modifier 310 if the encrypted account number 402 corresponds to the offer identifier 404. In one embodiment, the method 700 may further include: encrypting, using one of: the predetermined encryption key 306 or a second key corresponding to the predetermined encryption key, the offer identifier 404 to obtain an encrypted offer identifier, wherein the updating step is performed if the encrypted account number 402 corresponds to the encrypted offer identifier. In another embodiment, the offer identifier 404 may be an encrypted identifier.

In one embodiment, the method 700 may further include transmitting, by a transmitting device (e.g., the transmitting unit 206), at least the transaction data 212 and the payment data to an acquirer for use in processing the payment transaction. In an alternative embodiment, the method 700 may further include: generating, by the processing device 208, an authorization request for the payment transaction, wherein the authorization request includes at least the transaction data 212 and the payment data; and transmitting, by the transmitting unit 206, the authorization request to a payment network (e.g., the payment network 112).

Exemplary Method for Distributing Offer Data

Figure 8:
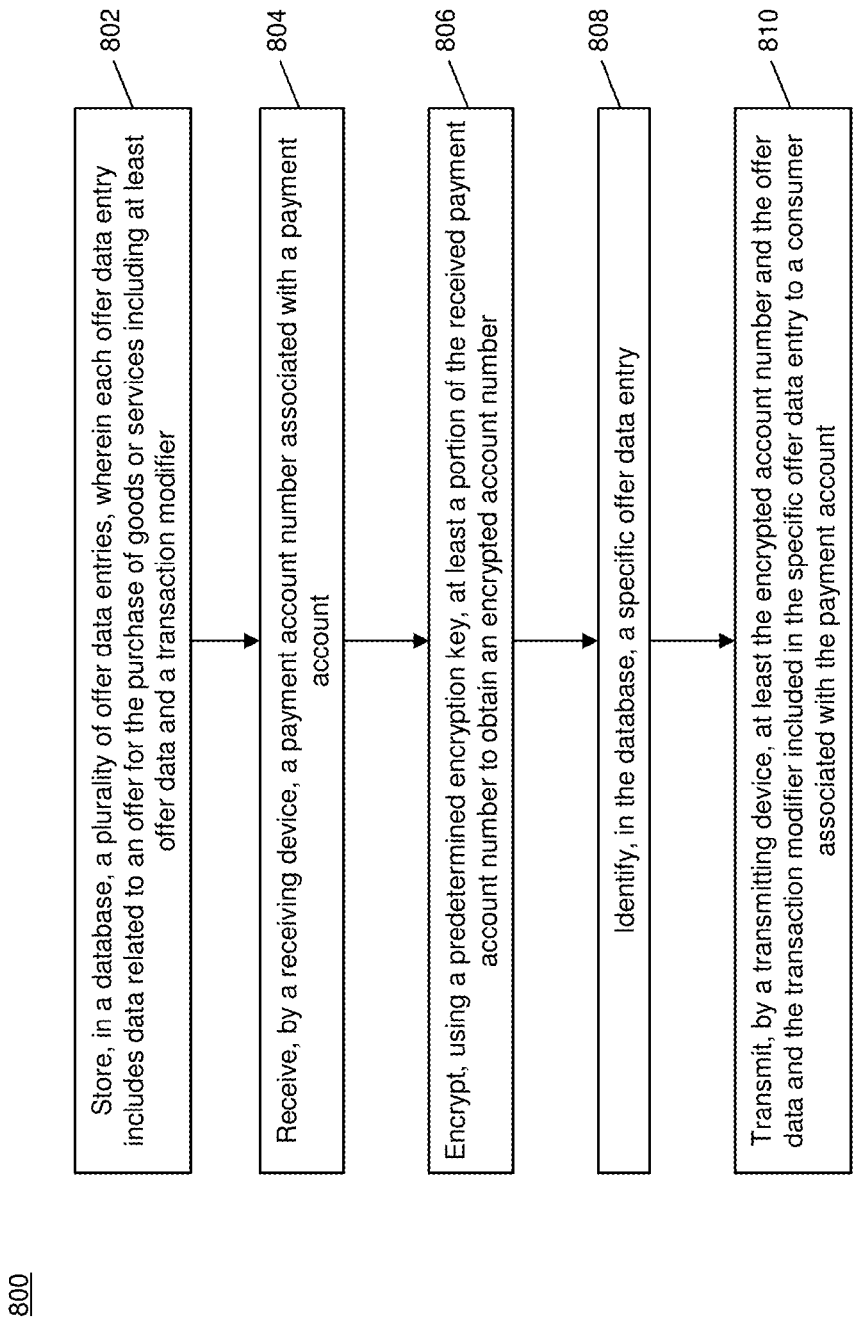
FIG. 8 is a flow chart illustrating an exemplary method for distributing offer data in accordance with exemplary embodiments.

FIG. 8 illustrates a method 800 for distributing offer data for a personalized offer 316 associated with a consumer 102.

In step 802, a plurality of offer data entries may be stored, in a database, wherein each offer data entry may include data related to an offer for the purchase of goods or services including at least offer data (e.g., the offer data 308) and a transaction modifier (e.g., the transaction modifier 310). In one embodiment, the offer data 308 may further include at least one of: offer name, offer description, offer type, manufacturer data, merchant data, product data, start date, expiration date, quantity, and limitation on redemption.

In step 804, a payment account number (e.g., the payment account number 304) associated with a payment account may be received, by a receiving device (e.g., the receiving unit 202). In step 806, at least a portion of the received payment account number 304 may be encrypted, using a predetermined encryption key (e.g., the encryption key 306) to obtain an encrypted account number (e.g., the encrypted account number 402). In one embodiment, encrypting at least a portion of the payment account number 304 may include encrypting predetermined digits of the payment account number 304.

In step 808, a specific offer data entry may be identified in the database. In step 810, a transmitting device may transmit at least the encrypted account number 402 and the offer data 308 and the transaction modifier 310 included in the specific offer data entry to the consumer 102. In one embodiment, the method 800 may further include generating, by a processing device, a machine-readable code (e.g., the machine-readable code 318) encoded with at least the encrypted account number 402 and the offer data 308 and the transaction modifier 310 included in the specific offer data entry, wherein transmitting at least the encrypted account number 402 and the offer data 308 and transaction modifier 310 included in the specific offer data entry to the consumer 102 includes transmitting the generated machine-readable code 318 to the consumer 102.

Computer System Architecture

Figure 9:
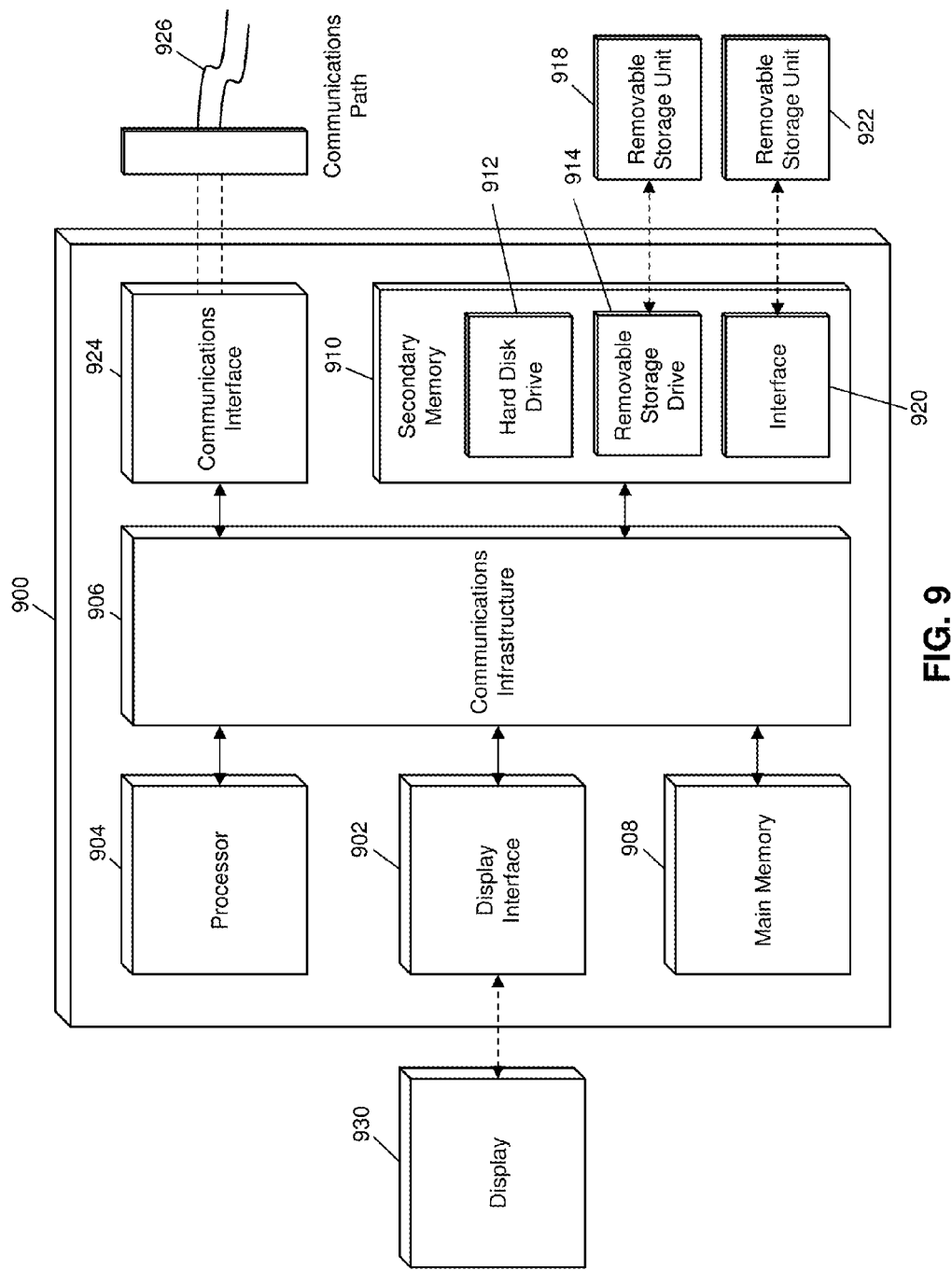
FIG. 9 is a block diagram illustrating a computer system architecture in accordance with exemplary embodiments.

FIG. 9 illustrates a computer system 900 in which embodiments of the present disclosure, or portions thereof, may be implemented as computer-readable code. For example, the point of sale 110 or the offer provider 108 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-8.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor 904 may be a special purpose or a general purpose processor device. The processor 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

Techniques consistent with the present disclosure provide, among other features, systems and methods for discounting a payment transaction and distributing offer data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for discounting a payment transaction, comprising:
   storing, in a memory, transaction data for a payment transaction, wherein the transaction data includes at least a transaction amount;
   receiving, by a receiving device, payment card data of a payment card of a consumer, wherein said payment card data is associated with a payment account of the consumer and includes at least a payment account number;

receiving, by the receiving device, offer data, wherein the offer data includes an offer identifier associated with the payment account of the consumer and a transaction modifier;

encrypting, using a predetermined encryption key, at least a portion of the payment account number included in the received payment card data of the payment card to obtain an encrypted account number; and updating, in the memory, the transaction amount included in the transaction data based on the transaction modifier when the encrypted account number corresponds to the offer identifier.

2. The method of claim 1, wherein receiving the payment card data includes reading, by a first reading device, data encoded on the payment card and decoding, by a processing device, the read data to obtain the payment card data, and receiving the offer data includes reading, by a second reading device, encoded offer data encoded in a machine-readable code, and decoding, by the processing device, the read encoded offer data to obtain the offer data.

3. The method of claim 2, wherein the first reading device and the second reading device are a single device.

4. The method of claim 1, wherein the offer identifier is an encrypted identifier.

5. The method of claim 1, wherein encrypting at least a portion of the payment account number includes encrypting predetermined digits of the payment account number.

6. A method for discounting a payment transaction, comprising storing, in a memory, transaction data for a payment transaction, wherein the transaction data includes at least a transaction amount;

receiving, by a receiving device, payment card data of a payment card of a consumer, wherein said payment card data is associated with a payment account of the consumer and includes at least a payment account number;

receiving, by the receiving device, offer data, wherein the offer data includes an offer identifier associated with the payment account of the consumer and a transaction modifier;

encrypting, using a predetermined encryption key, at least a portion of the payment account number included in the payment card data of the payment card to obtain an encrypted account number;

encrypting, using one of: the predetermined encryption key or a second key corresponding to the predetermined encryption key, the offer identifier to obtain an encrypted offer identifier; and updating, in the memory, the transaction amount included in the transaction data based on the transaction modifier when the encrypted account number corresponds to the encrypted offer identifier.

7. A system for discounting a payment transaction, comprising:

a memory configured to store transaction data for a payment transaction, wherein the transaction data includes at least a transaction amount;

a receiving device configured to receive payment card data associated with a payment card account of a consumer, wherein the payment card data includes at least a payment account number, and offer data, wherein the offer data includes an offer identifier associated with the payment account of the consumer and a transaction modifier; and a processing device configured to encrypt, using a predetermined encryption key, at least a portion of the payment account number included in the payment card data of the payment card to obtain an encrypted account number; and update, in the memory, the transaction amount included in the transaction data based on the transaction modifier when the encrypted account number corresponds to the offer identifier.

8. The system of claim 7, further comprising:

a first reading device configured to read data encoded on the payment card;

a second reading device configured to read encoded offer data encoded in a machine-readable code, and a processing device configured to decode the read encoded data to obtain the payment card data, and the read encoded offer data to obtain the offer data.

9. The system of claim 8, wherein the first reading device and the second reading device are a single device.

10. The system of claim 7, wherein the offer identifier is an encrypted identifier.

11. The system for discounting a payment transaction, comprising:

a memory configured to store transaction data for a payment transaction, wherein the transaction data includes at least a transaction amount;

a receiving device configured to receive payment card data associated with a payment card account of a consumer, wherein the payment card data includes at least a payment account number, and offer data, wherein the offer data includes an offer identifier associated with the payment account of the consumer and a transaction modifier; and a processing device configured to encrypt, using a predetermined encryption key, at least a portion of the payment account number included in the payment card data of the payment card to obtain an encrypted account number, encrypt, using one of the predetermined encryption key or a second key corresponding to the predetermined encryption key, the offer identifier to obtain an encrypted offer identifier, and update, in the memory, the transaction amount included in the transaction data based on the transaction modifier when the encrypted account number corresponds to the encrypted offer identifier.

12. The system of claim 7, wherein encrypting at least a portion of the payment account number includes encrypting predetermined digits of the payment account number.

* * * * *